(12) United States Patent
Koizumi et al.

(10) Patent No.: US 8,591,083 B2
(45) Date of Patent: Nov. 26, 2013

(54) VEHICULAR LAMP

(75) Inventors: Hiroya Koizumi, Shizuoka (JP);
Kazunori Natsume, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 332 days.

(21) Appl. No.: 13/083,814

(22) Filed: Apr. 11, 2011

(65) Prior Publication Data

US 2011/0249462 A1  Oct. 13, 2011

(30) Foreign Application Priority Data

Apr. 12, 2010  (JP) .................................. 2010-091108

(51) Int. Cl.
*F21V 5/00*  (2006.01)
(52) U.S. Cl.
USPC ........................... 362/522; 362/520; 362/545
(58) Field of Classification Search
USPC ......... 362/516–522, 545, 240, 241, 244–246, 362/308, 309, 311.02, 333
See application file for complete search history.

(56) References Cited

U.S. PATENT DOCUMENTS

| | | | | |
|---|---|---|---|---|
| 6,367,950 | B1 * | 4/2002 | Yamada et al. | 362/245 |
| 6,755,556 | B2 * | 6/2004 | Gasquet et al. | 362/329 |
| 7,270,454 | B2 * | 9/2007 | Amano | 362/522 |
| 8,061,880 | B2 * | 11/2011 | Lambert et al. | 362/511 |
| 2005/0152153 | A1 * | 7/2005 | Amano | 362/520 |
| 2005/0265041 | A1 * | 12/2005 | Wimbert | 362/545 |

FOREIGN PATENT DOCUMENTS

JP  2005-203111 A  7/2005

* cited by examiner

*Primary Examiner* — Bao Q Truong
(74) *Attorney, Agent, or Firm* — Sughrue Mion, PLLC

(57) ABSTRACT

A vehicular lamp includes: a light-emitting element arranged face forward; and a translucent member arranged to cover the light-emitting element from its front side. The member has a horizontally oblong shape in a front view, and includes: a direct light control portion located near the optical axis and directly emitting light forward from a front surface of the member; reflected light control portions located both sides of the direct light control portion and internally reflecting the entered light on a rear surface of the member to form substantially parallel light directed forward and emitting the light forward from the front surface; and a curved-surface light incident area formed on the rear surface to allow light from the light-emitting element to enter as substantially parallel light with respect to a cross section parallel to the axis and a longitudinal direction of the member in the direction perpendicular to the cross section.

18 Claims, 6 Drawing Sheets

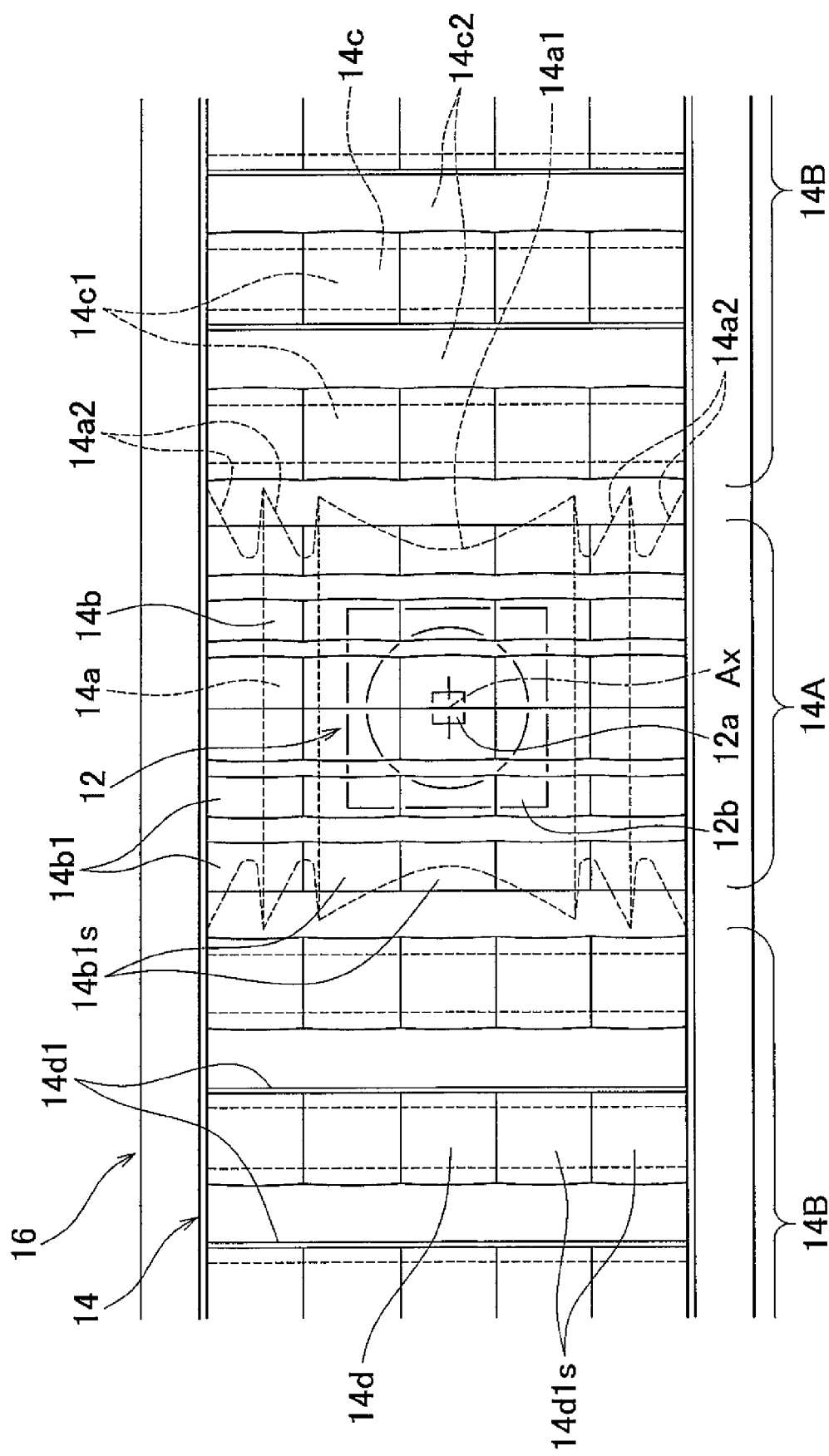

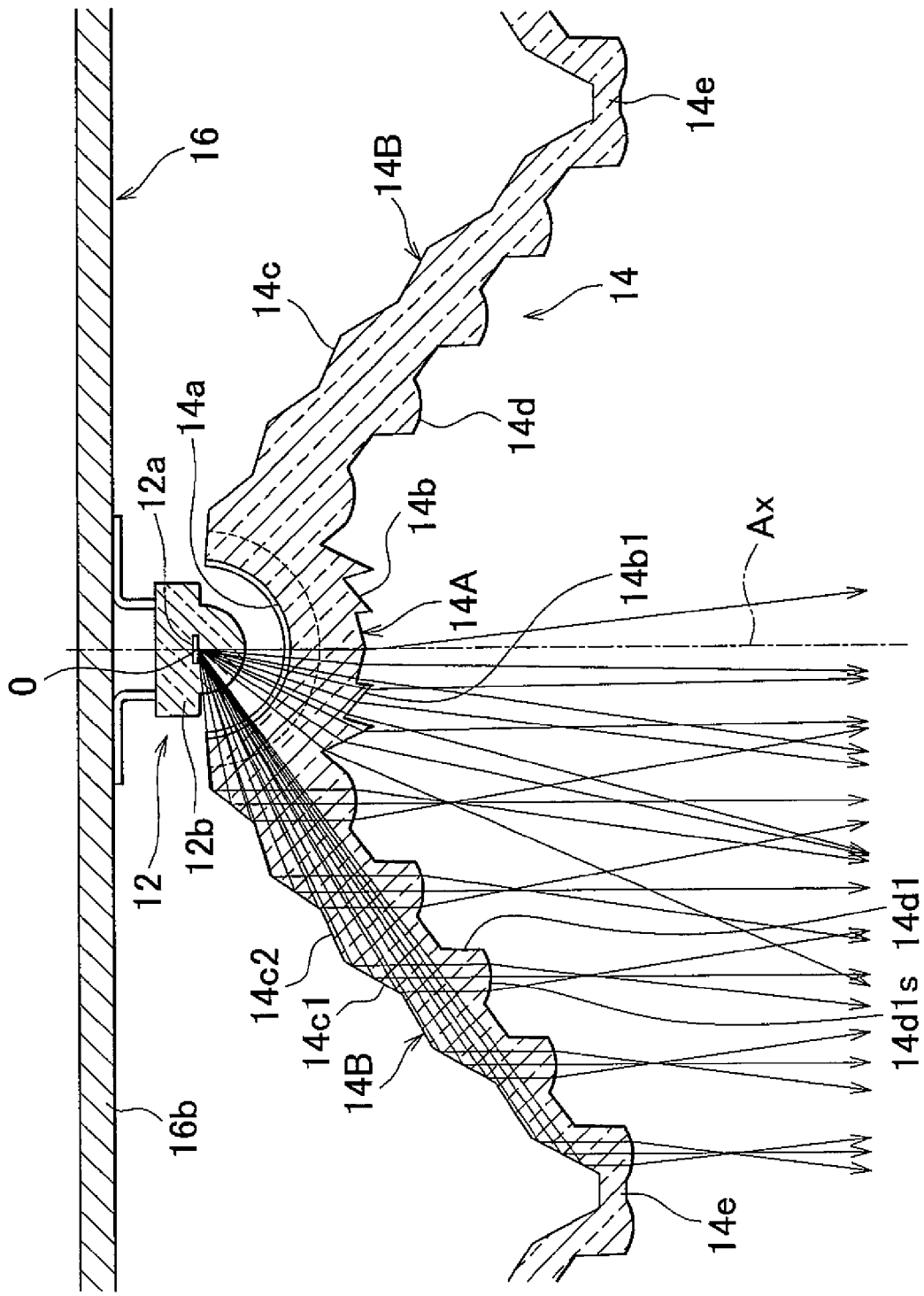

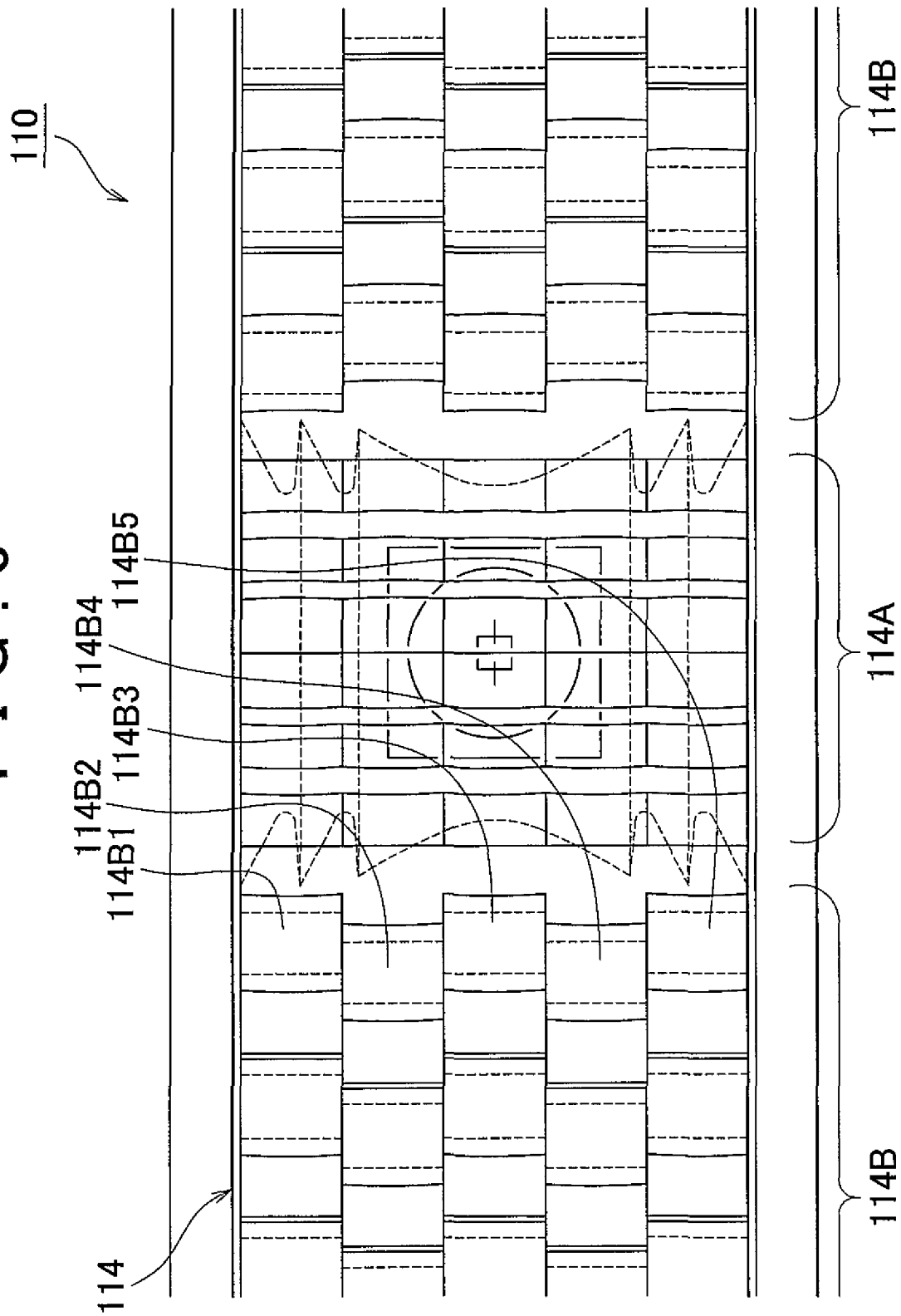

VEHICULAR LAMP

INCORPORATION BY REFERENCE

The disclosure of Japanese Patent Application No. 2010-091108 filed on Apr. 12, 2010 including the specification, drawings and abstract is incorporated herein by reference in its entirety.

BACKGROUND OF THE INVENTION

1. Field of the Invention

The invention relates to a vehicular lamp that uses a light-emitting element as a light source.

2. Description of the Related Art

Vehicular lamps that use a light-emitting element, such as a light-emitting diode, as a light source are widely employed.

For example, Japanese Patent Application Publication No. 2005-203111 (JP-A-2005-203111) describes a vehicular lamp. The vehicular lamp includes a light-emitting element and a translucent member. The light-emitting element is arranged to face forward with respect to the lamp so that an optical axis extends in a front-rear direction of the lamp. The translucent member is arranged so as to cover the light-emitting element from its front side.

In the vehicular lamp described in JP-A-2005-203111, a center area of the translucent member, located near the optical axis, is configured to allow light that enters the translucent member from the light-emitting element to be directly emitted forward from its front surface. In addition, a peripheral area of the translucent member around the center area is configured to allow light that enters the translucent member from the light-emitting element to be internally reflected on its rear surface to form substantially parallel rays of light directed forward and then to allow the substantially parallel rays of light to be emitted forward from its front surface.

When the translucent member described in JP-A-2005-203111 is used, it is possible to improve the appearance of the lamp when the lamp is turned on and to accurately perform light distribution control while the luminous flux utilization factor of light from the light-emitting element is increased.

However, the vehicular lamp described in JP-A-2005-203111 is configured so that the peripheral area of the translucent member serves as a mortar-like light guide, so, for example, when the above vehicular lamp is applied to a vehicular lamp having a narrow vertical width as in the case of a high mount stop lamp, it is difficult to increase the luminous flux utilization factor of light from the light-emitting element.

SUMMARY OF INVENTION

The invention provides a vehicular lamp that uses a light-emitting element as a light source and that is able to improve the appearance of the lamp when the lamp is turned on and to accurately perform light distribution control while the luminous flux utilization factor of light from the light-emitting element is increased.

In the invention, the outer shape of a translucent member and the shape of a light incident area of the translucent member while the translucent member is arranged so as to cover a light-emitting element from its front side.

A first aspect of the invention provides a vehicular lamp. The vehicular lamp includes: a light-emitting element that is arranged to face forward with respect to the lamp so that an optical axis extends in a front-rear direction of the lamp; and a translucent member that is arranged so as to cover the light-emitting element from a front side of the light-emitting element. The translucent member has a horizontally oblong shape in a front view of the lamp, and the translucent member includes: a direct light control portion that is located near the optical axis in the translucent member and that is configured to directly emit light, which enters the translucent member from the light-emitting element, forward from a front surface of the translucent member; reflected light control portions that are respectively located on both right and left sides of the direct light control portion in the translucent member and that is configured to internally reflect light, which enters the translucent member from the light-emitting element, on a rear surface of the translucent member to form substantially parallel rays of light directed forward and then to emit the light forward from the front surface of the translucent member; and a light incident area that is formed of a curved surface on the rear surface of the translucent member so as to allow light, which enters from the light-emitting element, to enter the translucent member in the form of substantially parallel rays of light with respect to a cross section that is parallel to the optical axis and parallel to a longitudinal direction of the translucent member in the direction perpendicular to the cross section.

BRIEF DESCRIPTION OF DRAWINGS

The features, advantages, and technical and industrial significance of this invention will be described below with reference to the accompanying drawings, in which like numerals denote like elements, and wherein:

FIG. 4 is a detailed view of the portion IV in FIG. 1;

FIG. 5 is a detailed view of the portion V in FIG. 2; and

FIG. 6 is a view that shows an alternative embodiment to the embodiment and is similar to FIG. 4.

DETAILED DESCRIPTION OF EMBODIMENTS

Hereinafter, an embodiment of the invention will be described with reference to the accompanying drawings.

Figure 1:
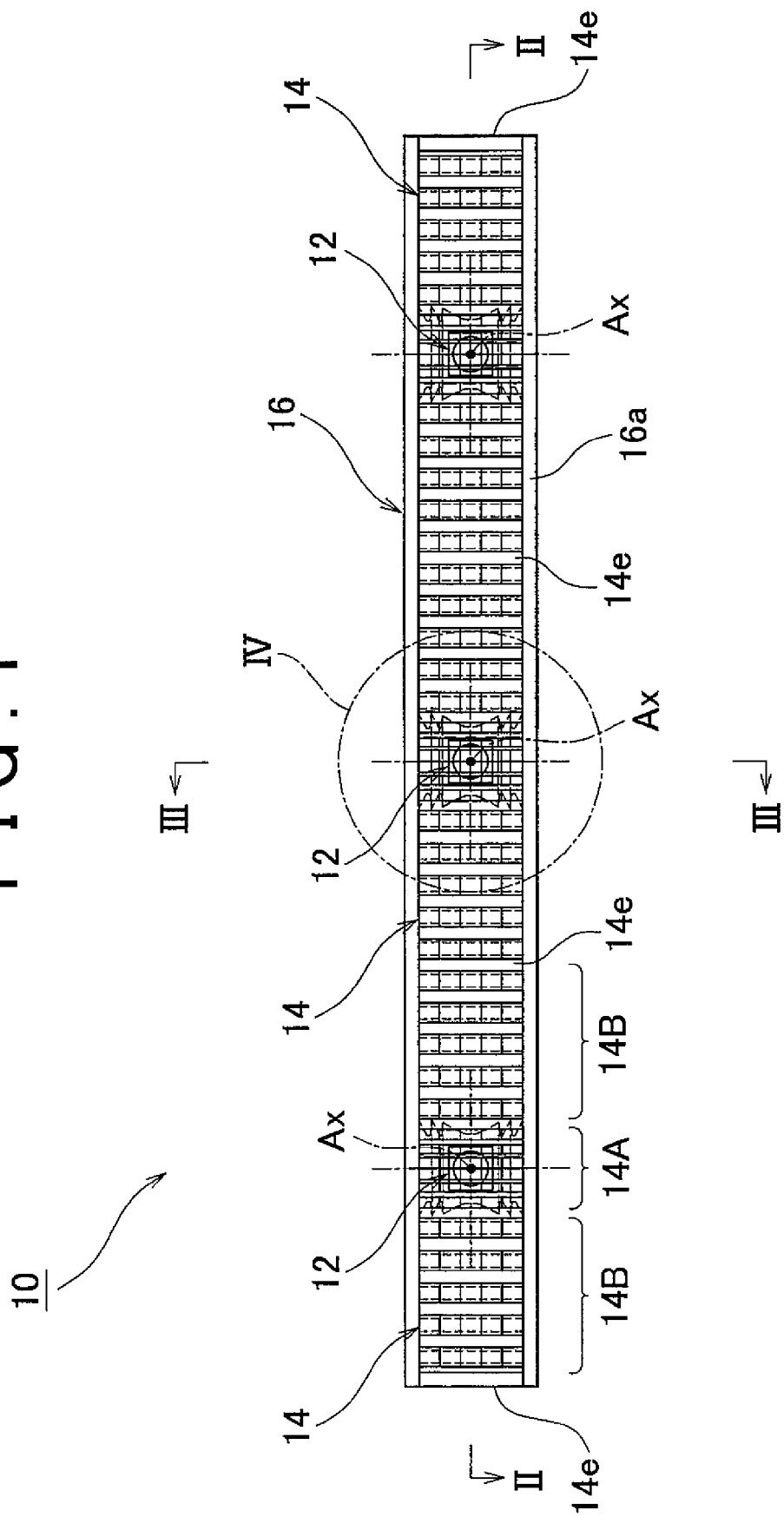
FIG. 1 is a front view that shows a vehicular lamp according to an embodiment of the invention.
Figure 2:
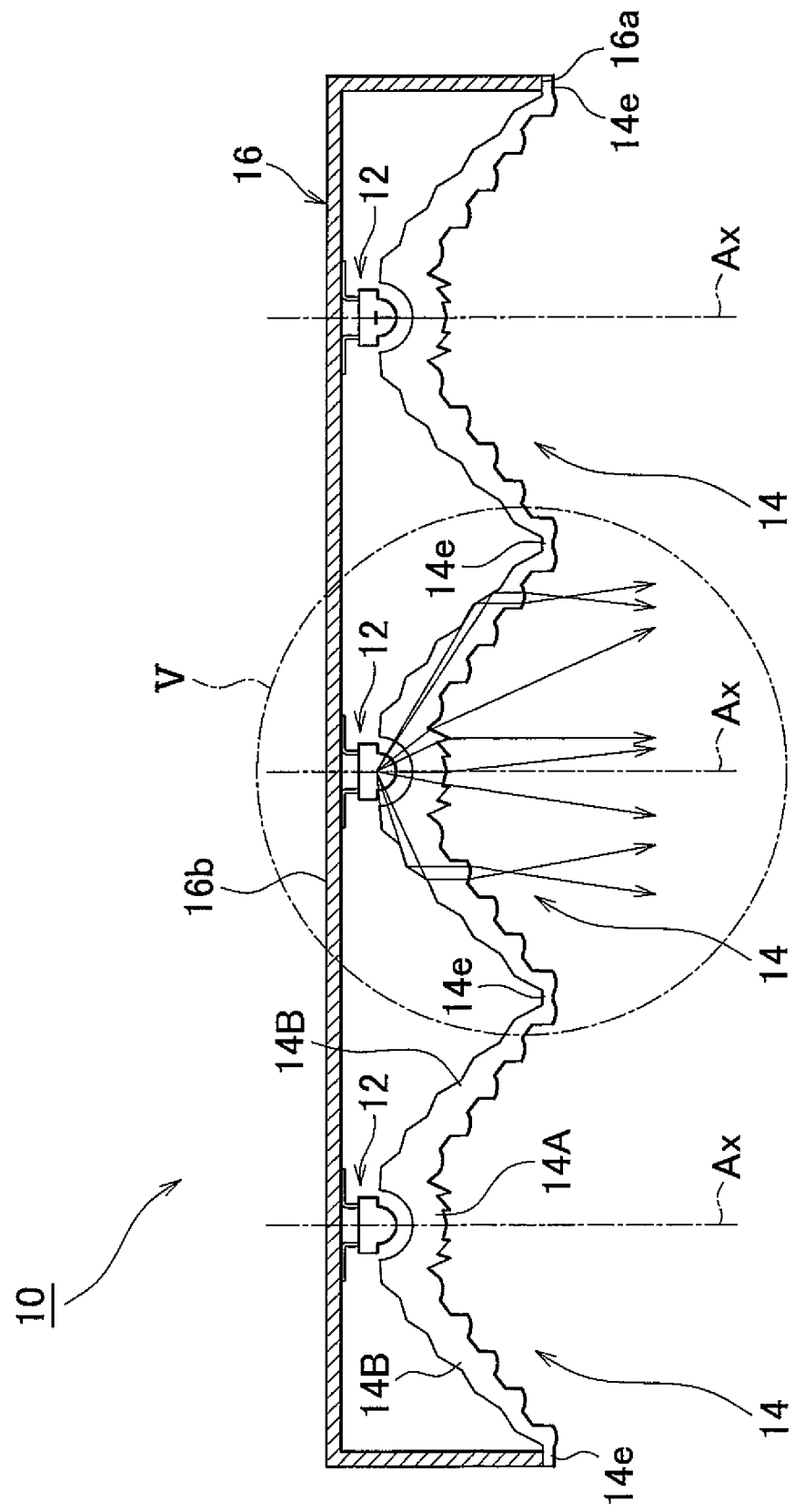
FIG. 2 is a cross-sectional view taken along the line II-II in FIG. 1.

A vehicular lamp 10 according to the present embodiment is a high mount stop lamp that is arranged on a rear tray in a cabin, a rear spoiler, or the like, of a vehicle. The vehicular lamp 10 has a horizontally oblong outer shape in its front view as shown in FIG. 1 and FIG. 2. In the embodiment, "horizontal direction" indicates that the longitudinal direction of the vehicular lamp 10 and "vertical direction" indicates that the direction in a direction perpendicular to a cross section that is parallel to an optical axis Ax and parallel to a longitudinal direction of the vehicular lamp 10.

The vehicular lamp 10 is configured so that three sets of a light-emitting element 12 and a translucent member 14 are assembled to a lamp body 16 in a state where they are arranged in parallel with one another in the longitudinal direction of the lamp 10 (hereinafter, referred to as "horizontal direction").

Then, the lamp body 16 is formed as a box-shaped member having a horizontally oblong front end opening 16a. In addition, the translucent members 14 of the respective sets each have a horizontally oblong shape in the front view of the lamp, and are integrally formed so as to be connected to each other at their right and left edge portions 14e. Then, these three integrally formed translucent members 14 are fixed to the front end opening 16a of the lamp body 16 by adhesion, or the like, at the right and left edge portions 14e located at both right and left sides of the three sets of translucent members 14 in a state where the translucent members 14 are fitted in the front end opening 16a of the lamp body 16.

In the vehicular lamp 10, the light-emitting element 12 and translucent member 14 of each set have a similar configuration.

Then, in the following description, the configuration of the set of light-emitting element 12 and translucent member 14 located in the middle will be representatively described in detail.

Figure 3:
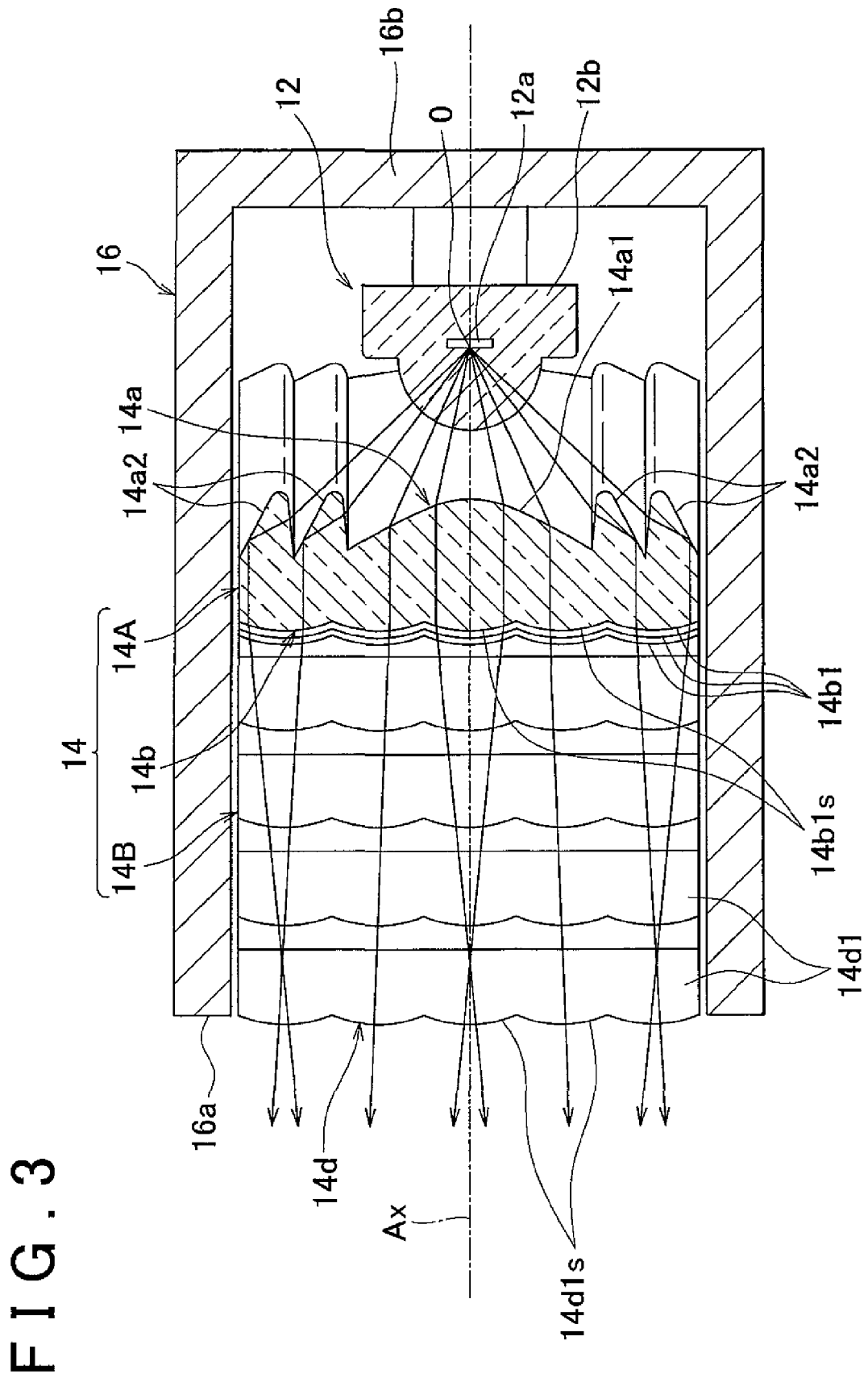
FIG. 3 is a detailed cross-sectional view taken along the line III-III in FIG. 1.

As shown in FIG. 3, FIG. 4 and FIG. 5, the light-emitting element 12 is a red light-emitting diode that is formed so that a light-emitting chip 12a having a size of about 0.3 to 1 mm square is covered with a hemispherical sealing resin 12b. The light-emitting element 12 is fixed to the rear surface wall 16b of the lamp body 16 in a state where the light-emitting chip 12a is arranged to face forward with respect to the lamp so that an optical axis Ax extends in the front-rear direction of the lamp (rearward of the vehicle).

The translucent member 14 is a translucent synthetic resin molded product. In the plan view of FIG. 5, the translucent member 14 has a cross-sectional shape that widens forward of the lamp in a substantially V shape, and is formed symmetrically with respect to the optical axis Ax. Then, the translucent member 14 is arranged so that the rear of the top portion of the translucent member 14 covers the light-emitting element 12 from the front side.

The translucent member 14 has a center area located near the optical axis Ax and peripheral areas located at both right and left sides of the center area. The center area functions as a direct light control portion 14A. The peripheral areas function as reflected light control portions 14B. In addition, the translucent member 14 has a light incident area 14a on the rear surface of its top portion. The light incident area 14a is used to allow light to enter the translucent member 14 from the light-emitting element 12.

Hereinafter, each of these direct light control portion 14A, reflected light control portions 14B and light incident area 14a will be described.

First, the configuration of the light incident area 14a will be described.

The light incident area 14a is formed in a semi-circular arc shape about a light emission center O of the light-emitting chip 12a in the plan view of FIG. 5, and is formed in the following special. Fresnel lens shape in the side view of FIG. 3.

That is, as shown in the side view of FIG. 3, the light incident area 14a has a portion 14a1 that is located near the optical axis Ax and portions 14a2 that are located at both upper and lower sides. The portion 14a1 has a convex lens shape. The portions 14a2 each have a substantially prism shape, and are formed in at least one layer.

Specifically, the first area 14a1 that is the portion located near the optical axis Ax is formed of a convex curve in a vertical plane (cross section that is perpendicular to the horizontal direction of the translucent member 14 and that passes through the optical axis Ax) that includes the optical axis Ax. The convex curve allows light (hereinafter, referred to as "reference output light") emitted from the light emission center O of the light-emitting chip 12a to enter the translucent member 14 in the form of parallel light that is parallel to the optical axis Ax. In addition, the second areas 14a2 that are the portions located at both upper and lower sides of the first area 14a1 each are formed of a substantially wedge-like curve in the vertical plane that includes the optical axis Ax. The substantially wedge-like curve allows the reference output light to enter the translucent member 14 so as to refract the reference output light in a direction away from the optical axis Ax and then internally reflects the reference output light in the form of parallel light that is parallel to the optical axis Ax.

Then, the light incident area 14a has a vertical cross-sectional shape as shown in FIG. 3, and is formed to extend in a circular arc shape toward both right and left sides of the optical axis Ax about a vertical line that passes through the light emission center O of the light-emitting chip 12a. By so doing, the light incident area 14a allows the reference output light to enter the translucent member 14 in the form of parallel light that is parallel to a horizontal plane that includes the optical axis Ax in terms of the vertical direction (direction perpendicular to a cross section that is parallel to the optical axis Ax and parallel to a longitudinal direction of the translucent member 14) of the reference output light, and allows the reference output light to enter the translucent member 14 in the form of light that radially travels in straight lines without refracting the reference output light in terms of the horizontal direction of the reference output light.

Next, the configuration of the direct light control portion 14A will be described.

As shown in FIG. 5, the direct light control portion 14A is configured to directly emit light, which enters the light incident area 14a of the translucent member 14 from the light-emitting element 12 at a relatively small horizontal open angle with respect to the optical axis Ax, forward from its front surface 14b in the form of diffused light.

That is, the front surface 14b of the direct light control portion 14A has a plurality of belt-shaped output portions 14b1 in vertical stripes. The plurality of belt-shaped output portions 14b1 have a substantially Fresnel lens-like horizontal cross-sectional shape (cross-sectional shape that is parallel to the horizontal direction of the translucent member 14 and that passes through the optical axis Ax) and extend in the vertical direction. As shown in FIG. 4, each of these belt-shaped output portions 14b1 is equally divided into five lens elements 14b1s in the vertical direction. Each of these lens elements 14b1s has a fisheye lens shape. By so doing, light that has reached each belt-shaped output portion 14b1 from the light-emitting element 12 is emitted forward at the corresponding lens elements 14b1s in the form of diffused light that diffuses in the vertical direction and in the horizontal direction.

Next, the configuration of the reflected light control portions 14B will be described.

The pair of reflected light control portions 14B are respectively arranged at both right and left sides of the direct light control portion 14A (that is, the center area); however, the shape of the pair of reflected light control portions 14B is symmetrical, so one of the pair of reflected light control portions 14B will be described.

As shown in FIG. 5, the reflected light control portion 14B is configured to internally reflect light, which enters the translucent member 14 through the light incident area 14a from the light-emitting element 12 at a relatively large horizontal open angle with respect to the optical axis Ax, on the rear surface 14c of the reflected light control portion 14B to form substantially parallel rays of light directed forward and then to emit the light forward from the front surface 14d of the reflected light control portion 14B in the form of diffused light.

In order to achieve the above, the reflected light control portion 14B is configured as follows.

That is, the rear surface 14c of the reflected light control portion 14B has five belt-shaped reflective elements 14c1 that are arranged in vertical stripes via respective belt-shaped step portions 14c2 in the horizontal direction of the translucent member 14.

Each belt-shaped reflective element 14c1 is formed of a parabolic cylinder extending in the vertical direction in a parabolic horizontal cross-sectional shape of which the axis is the optical axis Ax and the focal point is the light emission center O of the light-emitting chip 12a. The focal length of the parabola that constitutes the horizontal cross-sectional shape of each of these belt-shaped reflective elements 14c1 is set to be larger as the belt-shaped reflective element 14c1 is the one located closer to the outer peripheral side. Then, by so doing, reference output light, which enters the translucent member 14 from the light incident area 14a, is internally reflected forward on the belt-shaped reflective elements 14c1 in the form of parallel light that is parallel to the optical axis Ax. At this time, each of these belt-shaped reflective elements 14c1 is formed so that the incident angle of reference output light, which enters the translucent member 14 from the light incident area 14a, toward the belt-shaped reflective elements 14c1 is larger than the critical angle of a synthetic resin that constitutes the translucent member 14. By so doing, internal reflection on each belt-shaped reflective element 14c1 is total reflection.

Each belt-shaped step portion 14c2 is formed of a vertical plane extending in the vertical direction in a linear horizontal cross-sectional shape that radially extends from the light emission center O of the light-emitting chip 12a. By so doing, reference output light that enters the translucent member 14 through the light incident area 14a is not blocked by the belt-shaped step portions 14c2 but is allowed to reach the belt-shaped reflective elements 14c1 that are respectively located adjacent to the outer sides of the belt-shaped step portions 14c2.

On the other hand, the front surface 14d of the reflected light control portion 14B has belt-shaped protruding portions 14d1 that are located in front of the respective belt-shaped reflective elements 14c1. As shown in FIG. 4, the front end surface of each of these belt-shaped protruding portions 14d1 has five lens elements 14d1s that use a vertical plane perpendicular to the optical axis Ax as a reference plane. At this time, these lens elements 14d1s are formed so that the front end surface of each belt-shaped protruding portion 14d1 is equally divided into five areas in the vertical direction, and each of these lens elements 14d1s has a fisheye lens shape. By so doing, substantially parallel rays of light, which are internally reflected forward on the belt-shaped reflective elements 14c1, are emitted forward from the lens elements 14d1s of the front end surface of each belt-shaped protruding portion 14d1 located in front of the belt-shaped reflective elements 14c1 in the form of diffused light that diffuses in the vertical direction and in the horizontal direction about a direction parallel to the optical axis Ax.

Next, the operation and advantageous effects of the present embodiment will be described.

In the vehicular lamp 10 according to the present embodiment, the light-emitting element 12 is arranged to face forward with respect to the lamp so that an optical axis Ax extends in the front-rear direction of the lamp, and the translucent member 14 is arranged so as to cover the light-emitting element 12 from its front side, so it is possible to increase the luminous flux utilization factor of light from the light-emitting element 12.

At this time, the translucent member 14 is formed in a horizontally oblong shape in the front view of the lamp to thereby make it possible to reduce the vertical width of the vehicular lamp 10. The translucent member 14 has the light incident area 14a at its rear surface, and the light incident area 14a is formed of a curved surface that allows light to enter the translucent member 14 from the light-emitting element 12 in the form of substantially parallel rays of light in the vertical direction. Therefore, even when the translucent member 14 has a horizontally oblong shape, it is possible to sufficiently ensure the luminous flux utilization factor of light from the light-emitting element 12.

The peripheral areas located on both right and left sides of the center area of the translucent member 14 are formed as the reflected light control portions 14B that internally reflect light, which enters the translucent member 14 from the light-emitting element 12, on their rear surfaces 14c to form substantially parallel rays of light directed forward and that emit the light forward from their front surfaces 14d. Therefore, when the translucent member 14 is observed from the front side of the lamp, each peripheral area (that is, each reflected light control portion 14B) may be configured so that a plurality of portions in the horizontal direction appear to emit light. By so doing, it is possible to improve the appearance of the vehicular lamp 10 when the lamp is turned on.

As described above, according to the present embodiment, in the vehicular lamp 10 that uses the light-emitting element 12 as a light source, even when the lamp has a narrow vertical width, it is possible to improve the appearance of the lamp when the lamp is turned on and to accurately perform light distribution control while the luminous flux utilization factor of light from the light-emitting element 12 is increased.

As described above, the vehicular lamp 10 according to the present embodiment is configured so that each of the reflected light control portions 14B at both right and left sides of the center area is formed of a plurality of portions that are arranged in the horizontal direction in vertical stripes. By so doing, when the lamp is turned on, the translucent member 14 may be configured to appear to emit light at a plurality of portions in vertical stripes at each of the right and left sides of the center area. In addition, the translucent member 14 may be configured to appear to emit light uniformly as a whole in harmony with its horizontally oblong outer shape.

In addition, in the above configuration, a plurality of sets of the light-emitting element and the translucent member may be arranged in the horizontal direction. The vehicular lamp 10 according to the present embodiment is configured so that the three sets of light-emitting element 12 and translucent member 14 are arranged in the horizontal direction, so the vehicular lamp 10 may be caused to emit light in a long narrow shape in the horizontal direction. In addition, at this time, the translucent members 14 of the respective sets are integrally formed with each other, so it is possible to enhance the appearance of the vehicular lamp 10 when the lamp is not turned on and to simplify the configuration of the lamp.

In the above configuration, each reflected light control portion may be configured to be divided into a plurality of areas in the vertical direction. By so doing, positions to emit light may be varied from one another among the areas, so the vehicular lamp may have an original appearance.

In the vehicular lamp 10 according to the present embodiment, the translucent member 14 of each set may not be subjected to mirror surface treatment at all. Without mirror surface treatment at all, the appearance of the lamp when the lamp is not turned on may be further enhanced.

Furthermore, the vehicular lamp 10 according to the present embodiment has a narrow vertical width, so the vehicular lamp 10 may be easily arranged at a portion that has a limited vertical installation space. The vehicular lamp 10 according to the present embodiment may be used as a high mount stop lamp.

In the above embodiment, the three sets of light-emitting element 12 and translucent member 14 are arranged in the horizontal direction; instead, two or four or more sets of light-emitting element 12 and translucent member 14 may be arranged. Furthermore, only one set of light-emitting element 12 and translucent member 14 may be arranged.

Next, an alternative embodiment to the above embodiment will be described.

As shown in FIG. 6, the basic configuration of a vehicular lamp 110 is similar to that of the vehicular lamp 10 according to the above embodiment; however, the vehicular lamp 110 differs from the vehicular lamp 10 in that each reflected light control portion 114B of each translucent member 114 is equally divided into five areas in the vertical direction.

That is, the configuration of the first, third and fifth areas 114B1, 114B3 and 114B5 from the upper side among the five areas that constitute each of these reflected light control portions 114B is similar to the configuration of the corresponding portions of each reflected light control portion 14B of the translucent member 14; however, the second and fourth areas 114B2 and 114B4 from the upper side are shifted outward (that is, in a direction laterally away from the direct light control portion 114A) at a substantially half pitch from the first, third and fifth areas 114B1, 114B3 and 114B5 from the upper side.

By employing the configuration according to the present alternative embodiment, light-emitting portions of each reflected light control portion 114B may be shifted at a substantially half pitch in the horizontal direction between the first, third and fifth areas 114B1, 114B3 and 114B5 from the upper side and the second and fourth areas 114B2 and 114B4 from the upper side. Then, by so doing, the vehicular lamp 110 may have an original appearance.

In the above alternative embodiment, each reflected light control portion 114B of the translucent member 114 is equally divided into five areas in the vertical direction; instead, each reflected light control portion 114B may be unequally divided. In addition, each reflected light control portion 114B may be divided into four or less areas or six or more areas.

In the above embodiment and alternative embodiment, the vehicular lamp is not limited to a specific vehicular lamp; for example, a tail lamp, a stop lamp, a clearance lamp, a high mount stop lamp, or the like, may be employed as the vehicular lamp. In addition, the vehicular lamp may include only one set of light-emitting element and translucent member or may include a plurality of sets of light-emitting element and translucent member.

In the above embodiment and alternative embodiment, the light-emitting element means an element-like light source having a light-emitting portion that emits planar light in a substantially dot shape, and the type of the light-emitting element is not specifically limited.

In the above embodiment and alternative embodiment, the material of the translucent member is not specifically limited as long as the translucent member is made of a translucent material. For example, the material may be a translucent synthetic resin, a glass, or the like.

In the above embodiment and alternative embodiment, the specific shape of the front surface of the direct light control portion is not specifically limited as long as the direct light control portion is configured to directly output light, which enters the translucent member from the light-emitting element, forward from its front surface.

In the above embodiment and alternative embodiment, the specific shapes of the rear surface and front surface of the reflected light control portion are not specifically limited as long as the reflected light control portion is configured to internally reflect light, which enters the translucent member from the light-emitting element, on its rear surface to form substantially parallel rays of light directed forward and then to emit the parallel rays of light forward from its front surface.

In the above embodiment and alternative embodiment, the specific shape of the curved surface that constitutes the light incident area is not specifically limited as long as the curved surface allows light from the light-emitting, element to enter the translucent member in the form of substantially parallel rays of light in the vertical direction.

Note that numeric values described as specifications in the above embodiment and alternative embodiment are just illustrative and, of course, these numeric values may be set to different values where appropriate.

While some embodiments of the invention have been illustrated above, it is to be understood that the invention is not limited to details of the illustrated embodiments, but may be embodied with various changes, modifications or improvements, which may occur to those skilled in the art, without departing from the scope of the invention.

What is claimed is:

1. A vehicular lamp comprising:
   a light-emitting element that is arranged to face forward with respect to the lamp so that an optical axis extends in a front-rear direction of the lamp; and
   a translucent member that is arranged so as to cover the light-emitting element from a front side of the light-emitting element, wherein
   the translucent member has a horizontally oblong shape in a front view of the lamp, and
   the translucent member includes
   a direct light control portion that is located near the optical axis in the translucent member and that is configured to directly emit light, which enters the translucent member from the light-emitting element, forward from a front surface of the translucent member;
   reflected light control portions that are respectively located on both right and left sides of the direct light control portion in the translucent member and that is configured to internally reflect light, which enters the translucent member from the light-emitting element, on a rear surface of the translucent member to form substantially parallel rays of light directed forward and then to emit the light forward from the front surface of the translucent member; and
   a light incident area that is formed of a curved surface on the rear surface of the translucent member so as to allow light, which enters from the light-emitting element, to enter the translucent member in the form of substantially parallel rays of light with respect to a cross section that is parallel to the optical axis and parallel to a longitudinal direction of the translucent member in the direction perpendicular to the cross section.

2. The vehicular lamp according to claim 1, wherein each of the reflected light control portions at both right and left sides of the direct light control portion is formed of a plurality of portions that are arranged in vertical stripes.

3. The vehicular lamp according to claim 1, wherein each of the reflected light control portions is divided into a plurality of areas in the direction perpendicular to the cross section that is parallel to the optical axis and parallel to the longitudinal direction of the translucent member.

4. The vehicular lamp according to claim 1, wherein a plurality of sets of the light-emitting element and the translucent member are arranged in a longitudinal direction of the lamp, and the translucent members of these sets are integrally formed with each other.

5. The vehicular lamp according to claim 1, wherein the vehicular lamp is a high mount stop lamp.

6. The vehicular lamp according to claim 1, wherein the translucent member is configured so that the cross-sectional shape that is parallel to the longitudinal direction of the translucent member and that passes through the optical axis widens forward of the lamp in a substantially V shape.

7. The vehicular lamp according to claim 1, wherein the light incident area is formed so that the cross-sectional shape that is parallel to the longitudinal direction of the translucent member and that passes through the optical axis is a semicircular arc shape about the light-emitting element, and is formed in a Fresnel lens shape such that a portion located near the optical axis in a cross section that is perpendicular to the cross section that is parallel to the longitudinal direction of the translucent member and that passes through the optical axis is formed in a convex lens and portions located on both upper and lower sides of the portion located near the optical axis each have a substantially prism shape and each are formed in at least one layer.

8. The vehicular lamp according to claim 7, wherein
the light incident area includes a first area that is the portion located near the optical axis and second areas that are the portions located on both upper and lower sides of the first area,
the first area is formed of a convex curve in a vertical plane, which is cross section that is perpendicular to the cross section that is parallel to the longitudinal direction of the translucent member, that includes the optical axis,
the first area allows reference output light, which is light emitted from a light emission center of the light-emitting element, to enter the translucent member in the form of parallel light that is parallel to the optical axis,
the second areas each are formed of a substantially wedge-like curve in the vertical plane that includes the optical axis, and
each of the second areas allows the reference output light to enter the translucent member so that the reference output light is refracted in a direction away from the optical axis and then internally reflects the reference output light in the form of parallel light that is parallel to the optical axis.

9. The vehicular lamp according to claim 1, wherein the direct light control portion has a belt-shaped output portion extending in direction perpendicular to the cross section that is parallel to the optical axis and parallel to the longitudinal direction of the translucent member at a front surface portion of the direct light control portion, and the belt-shaped output portion has a substantially Fresnel lens-like cross-sectional shape that is parallel to the longitudinal direction of the translucent member and that passes through the optical axis.

10. The vehicular lamp according to claim 9, wherein a plurality of the belt-shaped output portions are formed in vertical stripes.

11. The vehicular lamp according to claim 10, wherein the belt-shaped output portion is divided into a plurality of lens elements in the direction perpendicular to the cross section that is parallel to the optical axis and parallel to the longitudinal direction of the translucent member, and each of the lens elements has a fisheye lens shape.

12. The vehicular lamp according to claim 1, wherein
a rear surface of each reflected light control portion has a plurality of belt-shaped reflective elements that are arranged in right and left sides of the translucent member in vertical stripes via respective belt-shaped step portions, and
a front surface of each reflected light control portion has portions, which are located at front sides of the respective belt-shaped reflective elements, as belt-shaped protruding portions.

13. The vehicular lamp according to claim 12, wherein each of the belt-shaped reflective elements is formed of a parabolic cylinder extending in direction perpendicular to the cross section that is parallel to the optical axis and parallel to the longitudinal direction of the translucent member in a parabolic horizontal cross-sectional shape of which an axis is the optical axis and a focal point is a light emission center of the light-emitting element.

14. The vehicular lamp according to claim 13, wherein each of the belt-shaped reflective elements is formed so that an incident angle of reference output light, which enters the translucent member from a light incident area, toward the belt-shaped reflective elements is larger than a critical angle of a synthetic resin that constitutes the translucent member so as to internally reflect the reference output light on the belt-shaped reflective elements forward in the form of parallel light that is parallel to the optical axis.

15. The vehicular lamp according to claim 14, wherein each of the belt-shaped step portions is formed of a vertical plane extending in the direction perpendicular to the cross section that is parallel to the optical axis and parallel to the longitudinal direction of the translucent member in a linear horizontal cross-sectional shape that radially extends from the light emission center of the light-emitting element.

16. The vehicular lamp according to claim 12, wherein each of the belt-shaped protruding portions has a plurality of fisheye lens-shaped lens elements at its front end surface so as to divide the belt-shaped protruding portion into a plurality of areas, and the plurality of lens elements use a vertical plane perpendicular to the optical axis as a reference plane.

17. The vehicular lamp according to claim 1, wherein
each of the reflected light control portions is divided into a plurality of areas in a in the direction perpendicular to the cross section that is parallel to the optical axis and parallel to the longitudinal direction of the translucent member, and
even-numbered areas of the plurality of areas from an upper side are shifted in a direction away from the direct light control portion with respect to odd-numbered areas of the plurality of areas from the upper side.

18. The vehicular lamp according to claim 1, wherein
the light incident area is formed so that a cross-sectional shape, which is parallel to the longitudinal direction of the translucent member and which passes through the optical axis, forms a part of a circular shape about the light-emitting element.

* * * * *